United States Patent [19]
Grieser et al.

[11] Patent Number: 5,641,240
[45] Date of Patent: Jun. 24, 1997

[54] DRAWER BRACKET

[75] Inventors: Jerry D. Grieser, Archbold; Richard A. Nelson, Napoleon; Gordon D. Schumacher; Thomas B. Warner, both of Archbold; David M. Dietrich, Napoleon, all of Ohio

[73] Assignee: Sauder Woodworking Co., Archbold, Ohio

[21] Appl. No.: 551,318

[22] Filed: Nov. 1, 1995

[51] Int. Cl.$^6$ ............................. F16B 2/00; F16B 12/20
[52] U.S. Cl. .................... 403/403; 403/231; 403/233; 312/348.4; 312/265.5
[58] Field of Search ........................ 403/403, 401, 403/402, 231, 233, 262; 312/348.4, 348.1, 348.2, 263, 265.5

[56] References Cited

U.S. PATENT DOCUMENTS

| | | | |
|---|---|---|---|
| 501,564 | 7/1893 | Goodyear | 403/403 |
| 3,425,725 | 2/1969 | Givot et al. | 403/403 |
| 4,014,618 | 3/1977 | Kristiansen | 403/403 X |
| 4,063,542 | 12/1977 | Courtwright | 312/263 X |
| 4,191,439 | 3/1980 | Cohen | 312/263 X |
| 4,973,187 | 11/1990 | Sauder | 403/403 X |
| 5,259,687 | 11/1993 | John | 403/403 X |

FOREIGN PATENT DOCUMENTS 1358863  7/1974  United Kingdom ............... 403/401

OTHER PUBLICATIONS

Brochure entitled "The Catalina Collection, Model #7815, 5–Drawer Chest", Sauder Woodworking Co., Apr. 1995, pp. 1–3, and 10–12.

*Primary Examiner*—Anthony Knight
*Attorney, Agent, or Firm*—Emch, Schaffer, Schaub & Porcello Co., L.P.A.

[57] ABSTRACT

A drawer bracket including a drawer front member defining at least one opening for receiving a fastening device. A drawer side member is adjacent the drawer front member. The side member is perpendicular to the front member. The side member has a front surface and a back surface. An attachment device is adjacent the back surface of the side member for attaching the side member to a drawer side.

7 Claims, 5 Drawing Sheets

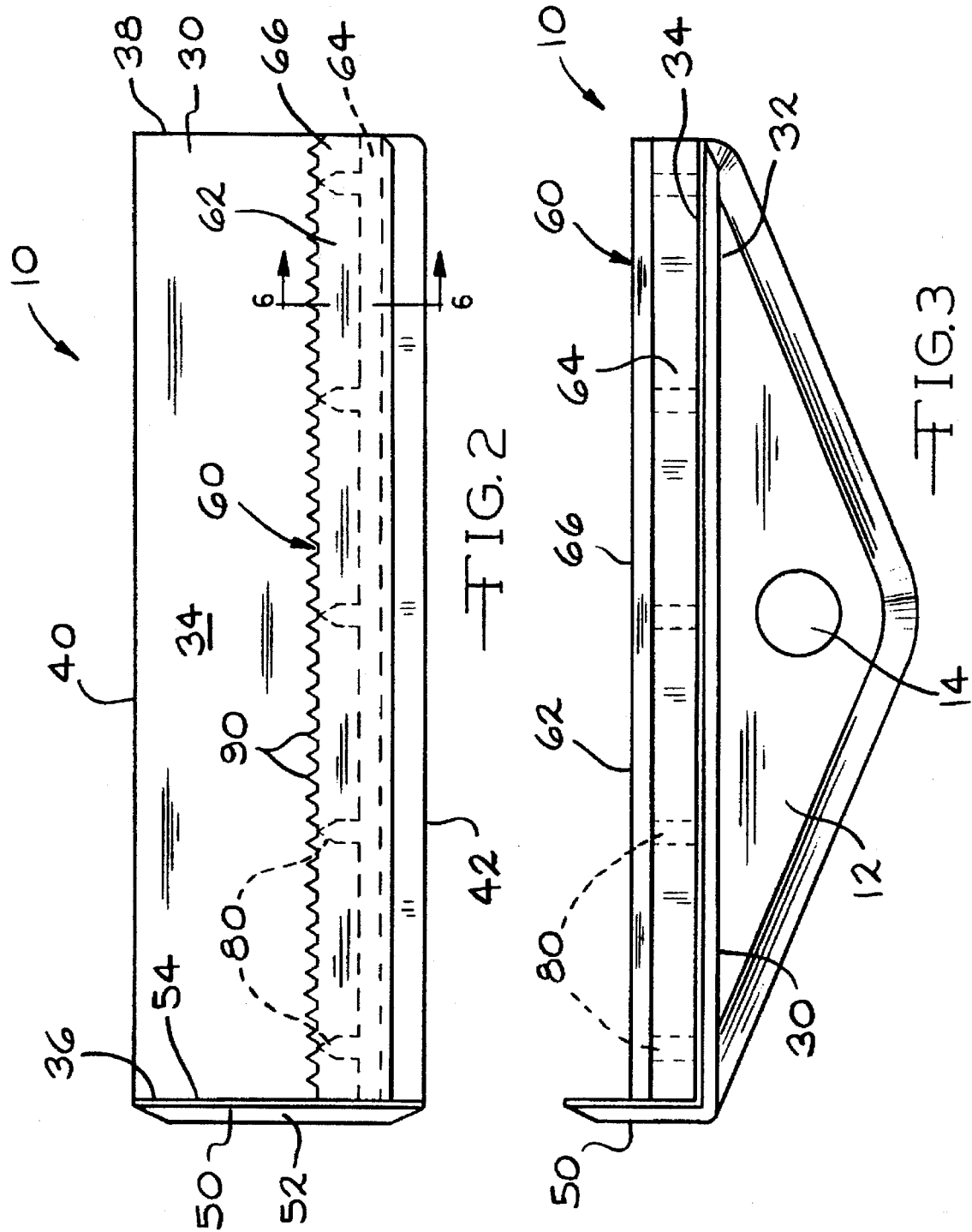

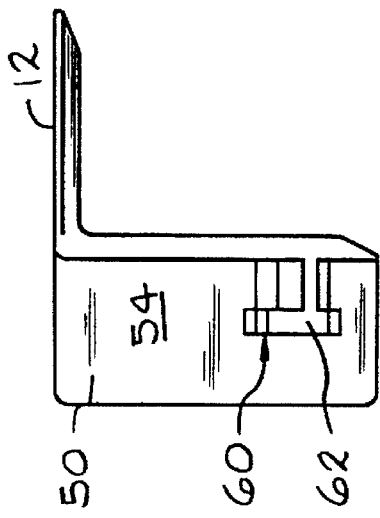
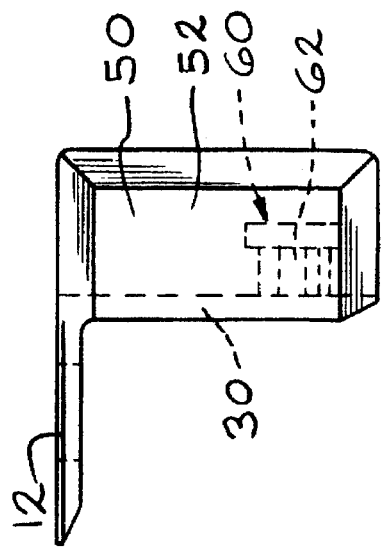
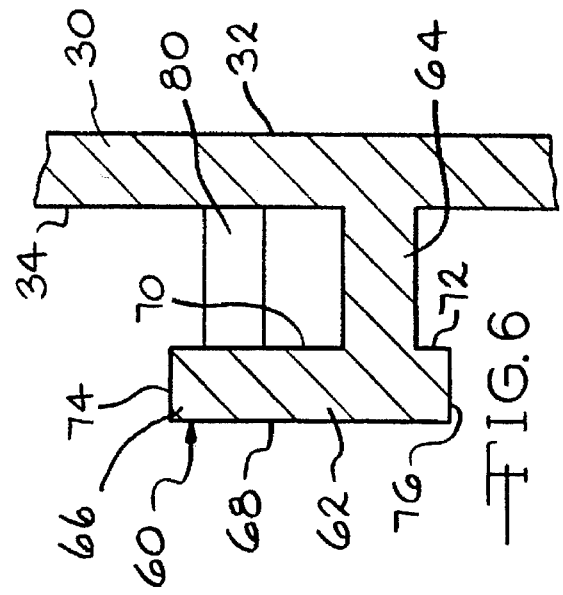

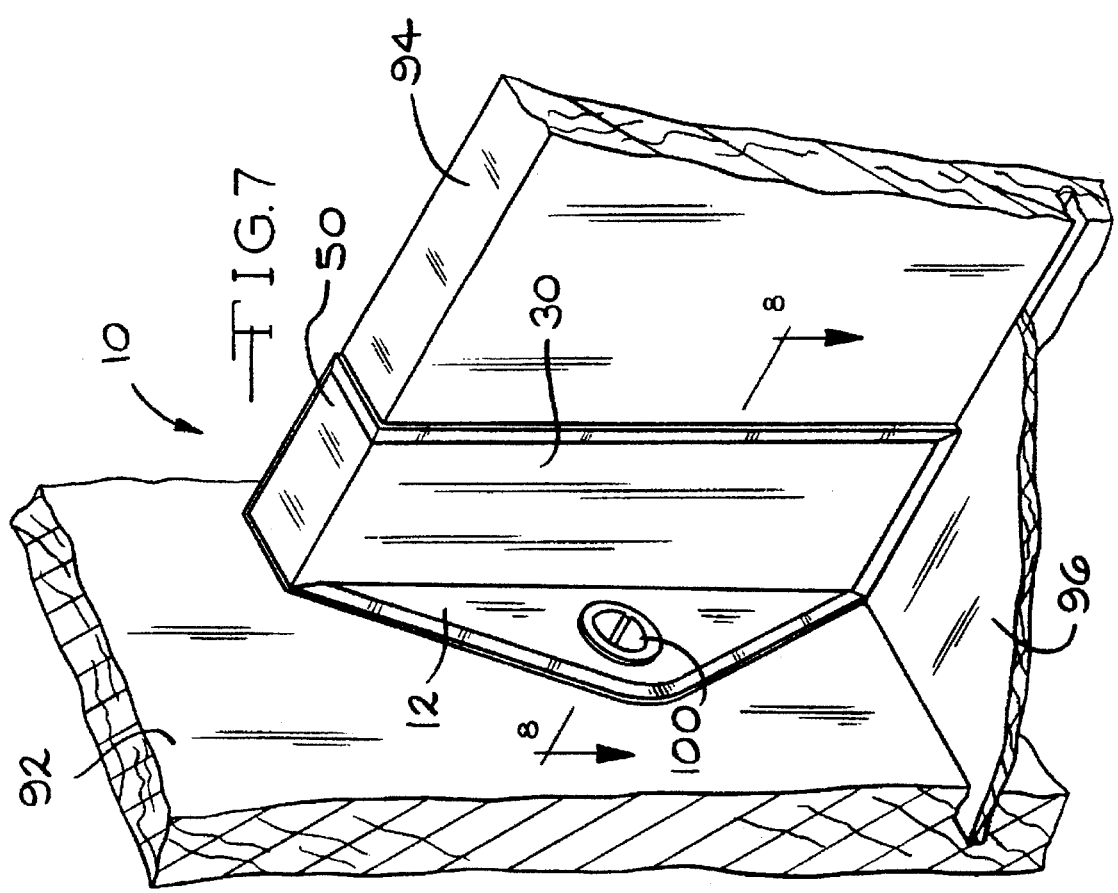

DRAWER BRACKET

BACKGROUND OF THE INVENTION

The present invention relates to a drawer bracket. More specifically, the invention is directed to a drawer bracket that joins the front of a drawer to the side of a drawer.

It has been found that there is a need for a drawer bracket that easily, quickly and efficiently joins the front of the drawer to the side of a drawer. In the past, the drawer front and the drawer side were attached by a plurality of screws. In this prior art assembly, the drawer front, drawer sides and drawer back were brought together to form a box in which the corners of the box were held together by screws. A front facing was then attached to the drawer front by additional screws. In the prior art assembly, the attachment of the drawer front to the drawer side was a time consuming and often inefficient process. Therefore, there is a need for a drawer bracket that eliminates the need for a plurality of screws in order to make the process of joining a drawer front to a drawer side easy and efficient.

The present invention satisfies the above-identified need. The present invention is directed to a unique drawer bracket that joins the drawer front to the drawer side by a single screw.

SUMMARY OF THE INVENTION

The present invention is directed to a drawer bracket for joining a drawer front to a drawer side. The bracket includes a drawer front member defining at least one opening for receiving a fastening device. A drawer side member is adjacent the drawer front member. The side member is perpendicular to the side member. The side member has a front surface and a back surface. An attachment device is adjacent the back surface of the side member. The attachment device attaches the side member to a drawer side.

It is the primary object of the present invention to provide a drawer bracket that easily and efficiently joins a drawer front to a drawer side.

Other objects and advantages of the invention shall become apparent to one skilled in the art upon a review of the following detailed description of the preferred embodiment with reference to the accompanying drawings.

BRIEF DESCRIPTION OF THE DRAWINGS

FIG. 2 is a side elevational view of the present invention showing the back surface of the drawer side member;

FIG. 3 is a front elevational view of the present invention showing the drawer front member and the attachment device;

FIG. 4 is a top view showing the drawer side top member and the drawer front member;

FIG. 5 is a bottom view of the present invention showing the drawer front member, the drawer side member, the attachment device and the drawer side top member;

FIG. 6 is a cross-sectional view taken along line 6—6 of FIG. 2;

FIG. 7 is a perspective view showing the drawer bracket of the present invention joining a drawer front to a drawer side.

DETAILED DESCRIPTION OF THE PREFERRED EMBODIMENT

Figure 1:
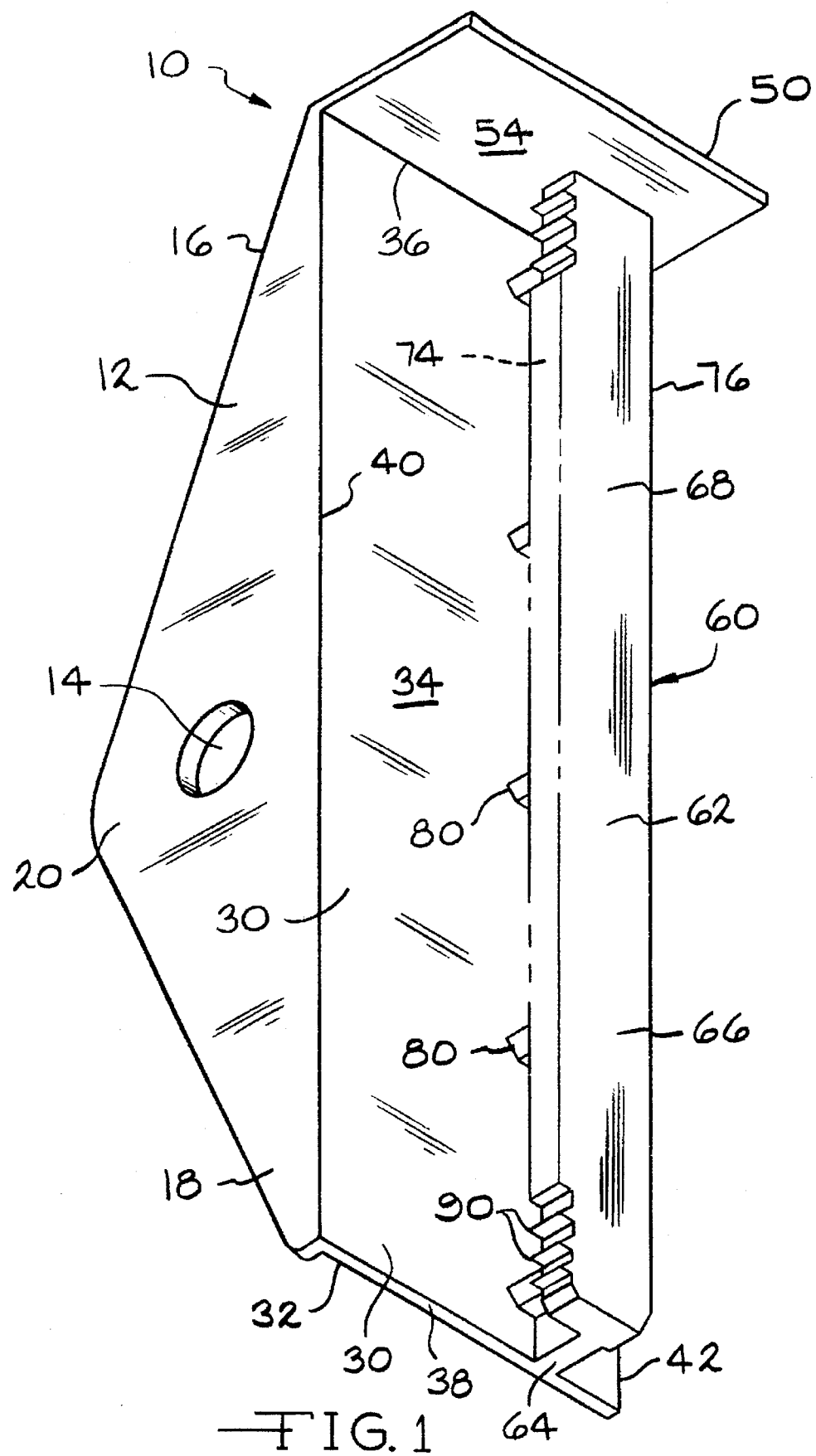
FIG. 1 is a perspective view of the drawer bracket according to the present invention.

The preferred embodiment and best mode of the present invention shall now be described in detail with reference being made to the accompanying drawings. The drawer bracket of the present invention is indicated generally in the drawings by the reference number "10". Referring to FIGS. 1 through 6, the drawer bracket 10 includes a drawer front member 12 that defines at least one opening for receiving a fastening device, such as a threaded screw. In the preferred embodiment, one opening 14 is defined in the drawer front member 12. The drawer front member 12 includes a top portion 16, a bottom portion 18 and a middle portion 20 that is equidistant between the top and bottom portions 16 and 18. As shown in FIGS. 1 and 3, the opening 14 is positioned in the middle portion 20. The drawer front member 12 can be formed in a variety of shapes, with a V-shape, as shown in FIG. 3, being preferred.

Referring to FIGS. 1, 2 and 3, the drawer bracket 10 includes a drawer side member 30 adjacent the drawer front member 12. The drawer side member 30 is perpendicular to the drawer front member 12. The drawer side member 30 has a front surface 32 and a back surface 34. As shown in FIG. 2, the back surface 34 of the drawer side member includes an upper edge 36, a lower edge 38, a first side edge 40 and a second side edge 42.

As shown in FIGS. 1 and 4, the drawer bracket 10 can include a drawer side top member 50 adjacent the drawer side member 30. The drawer side top member projects outwardly from the back surface 34 perpendicular to the drawer side member 30. The drawer side top member 50 includes an outside surface 52 and an inside surface 54.

Referring to FIGS. 1, 2 and 6, the drawer bracket 10 includes an attachment device 60 adjacent the back surface 34 of the drawer side member 30. The attachment device 60 is longitudinally extending with respect to the back surface 34. In the preferred embodiment, the attachment device 60 extends from the upper edge 36 to the lower edge 38 of the back surface 34. As shown in FIG. 1, the attachment device 60 is adjacent the inside surface 54 of the drawer side top member 50.

The attachment device 60 includes an outwardly projecting tongue 62. The tongue 62 includes a central portion 64 and a terminal portion 66. Referring to FIG. 6, the terminal portion 66 includes a front wall 68, a first back wall 70, a second back wall 72, a first side wall 74 and a second side wall 76. The front wall 68 is opposed to the first and second back walls 70 and 72. The first side wall 74 is opposed to the second side wall 76. The front wall 68 is parallel to the first and second back walls 70 and 72. The first side wall 74 is parallel to the second side wall 76. The front wall 68 and first and second back walls 70 and 72 are perpendicular to the first and second side walls 74 and 76. The front wall 68, first and second back walls 70 and 72, and first and second side walls 74 and 76 of the terminal portion 66 can form a variety of geometric configurations. In the preferred embodiment, as shown in FIG. 6, the geometric configuration is a rectangle. It should be understood that other geometric configurations, such as a square, can be used depending on the application.

Referring to FIGS. 1 through 3, the central portion 64 of the tongue 62 can include a plurality of spaced ribs 80. As shown in FIG. 6, the ribs 80 extend from the first back wall 70 to the back surface 34 of the drawer side member 30. The ribs 80 provide strength to the tongue 62. In the preferred embodiment, there are five ribs 80. However, any number of ribs can be used depending on the application.

As shown in FIGS. 1 and 2, the terminal portion 66 can include a plurality of gripping devices, such as teeth 90. In the preferred embodiment, the teeth 90 are positioned on the first side wall 74 of the terminal portion 66. It should be understood that the teeth 90 can also be positioned on the second side wall 76. The teeth 90 engage the drawer side when the drawer bracket 10 is positioned in the drawer side as described below.

Figure 8:
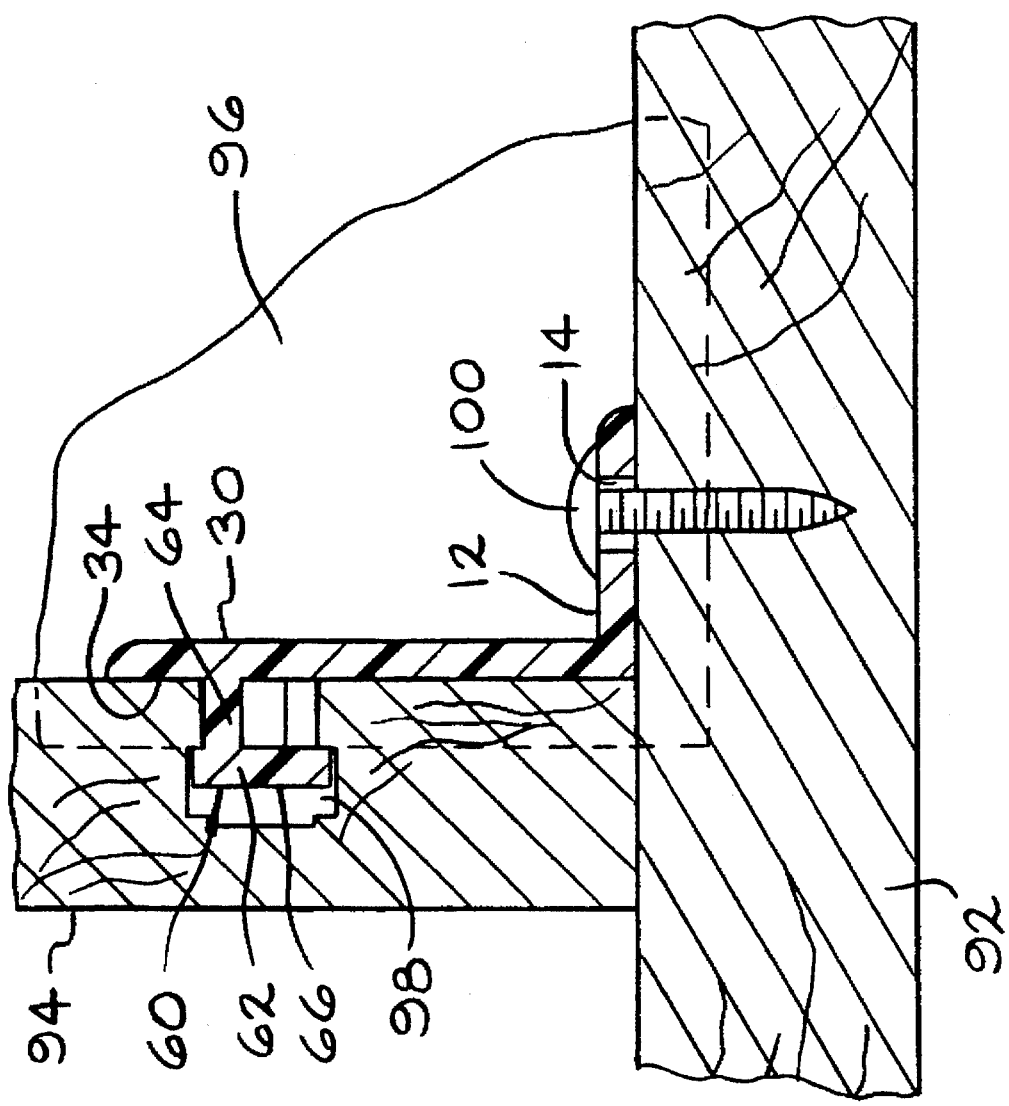
FIG. 8 is a cross-sectional view taken along line 8—8 of FIG. 7.

Referring now to FIGS. 7 and 8, the use of the drawer bracket 10 of the present invention will be described. The drawer bracket 10 is used to join a drawer front 92 to a drawer side 94. A drawer bottom 96 is positioned adjacent the drawer front 92 and drawer side 94. As shown in FIG. 8, the drawer side 94 includes a groove 98 that corresponds to the shape of the tongue 62 of the drawer bracket 10. During assembly of the drawer, the tongue 62 is slid into the groove 98. The back surface 34 of the drawer side member 30 engages the drawer side 94. The drawer front member 12 engages the drawer front 92. The drawer front 92 is joined to the drawer side 94 when a threaded screw 100 is inserted through the opening 14 and into the drawer front 92. As it will be appreciated by those skilled in the art, the drawer bracket 10 of the present invention eliminates many of the time consuming problems associated with prior art attachment devices.

While the invention has been described with reference to a preferred embodiment, it should be understood by those skilled in the art that various changes may be made and equivalents may be substituted for elements thereof without departing from the essential scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

We claim:

1. A bracket for joining a drawer front to a drawer side having a groove, comprising:

a drawer front member defining at least one opening for receiving a fastener to attach said front member to said drawer front;

a drawer side member positioned substantially perpendicular to said front member, said drawer side member having a front surface and a back surface, said back surface being adjacent said drawer side, said back surface including an upper edge and a lower edge; and an outwardly projecting tongue extending longitudinally between said upper edge and said lower edge, said tongue including a central portion and a terminal portion including a front wall and two opposed back walls, a first side wall and an opposed second side wall, said front wall being substantially parallel to said back walls, said first side wall being substantially parallel to said second side wall, said front and back walls being substantially perpendicular to said first and second side walls, said terminal portion defining a geometric configuration, said tongue being received by said groove to join said drawer front to said drawer side.

2. The drawer bracket of claim 1, wherein said bracket further includes a drawer side top member adjacent said drawer side member, said drawer side top member projecting outwardly from said back surface substantially perpendicular to said drawer side member.

3. The drawer bracket of claim 1, wherein said drawer front member includes a top portion, a bottom portion and a middle portion positioned substantially equidistant between said top and bottom portions, said opening positioned in said middle portion.

4. The drawer bracket of claim 1, wherein said central portion includes a plurality of spaced ribs.

5. The drawer bracket of claim 1, wherein at least one of said side wails includes gripping means.

6. The drawer bracket of claim 5, wherein said gripping means consist of a plurality of teeth.

7. The drawer bracket of claim 1, wherein said geometric configuration is a rectangle.

* * * * *